(12) United States Patent
Karsch

(10) Patent No.: US 9,718,346 B2
(45) Date of Patent: Aug. 1, 2017

(54) OPERATING FLUID CONTAINER HAVING A PREDETERMINED BREAKING POINT

(71) Applicant: Kautex Textron GmbH & Co. KG, Bonn (DE)

(72) Inventor: Ulrich Karsch, Niederkassel (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/426,654

(22) PCT Filed: Nov. 12, 2014

(86) PCT No.: PCT/EP2014/074387
§ 371 (c)(1),
(2) Date: Mar. 6, 2015

(87) PCT Pub. No.: WO2015/071319
PCT Pub. Date: May 21, 2015

(65) Prior Publication Data
US 2016/0243929 A1  Aug. 25, 2016

(30) Foreign Application Priority Data
Nov. 13, 2013  (DE) .......................... 10 2013 018 922

(51) Int. Cl.
*B60K 15/067* (2006.01)
*B60K 15/03* (2006.01)

(52) U.S. Cl.
CPC .................. *B60K 15/03177* (2013.01); *B60K 2015/03493* (2013.01)

(58) Field of Classification Search
CPC . B60K 15/03177; B60K 15/067; B60K 15/03
(Continued)

(56) References Cited

U.S. PATENT DOCUMENTS

| 7,955,672 B2 | 6/2011 | Kanazawa et al. |
| 2013/0193139 A1 | 8/2013 | Karsch |

(Continued)

FOREIGN PATENT DOCUMENTS

| DE | 9005537 U1 | 7/1990 |
| EP | 1108595 A2 | 6/2001 |
| WO | 2012139962 A1 | 10/2012 |

OTHER PUBLICATIONS

English language PCT International Search Report and Written Opinion mailed Jan. 26, 2015, received in corresponding PCT Application No. PCT/EP14/74387, 9 pgs.

*Primary Examiner* — Anthony Stashick
*Assistant Examiner* — Raven Collins
(74) *Attorney, Agent, or Firm* — Grossman Tucker Perreault & Pfleger, PLLC

(57) ABSTRACT

The present invention relates to an operating fluid container (1) composed of thermoplastic for a motor vehicle, comprising a reinforcing element (10; 11, 12), which is arranged between two container walls (2, 3) of the operating fluid container (1) and is at least indirectly joined to the container walls (2, 3). The operating fluid container (1) according to the invention is characterized by the fact that the container walls (2, 3) are joined to one another indirectly via the reinforcing element (10; 11, 12) by means of at least one joining element (20; 21-25). In this arrangement, the joining element (20; 21-25) comprises at least two material layers (21-25) joined to one another, wherein a joining force joining the two material layers (21, 22) to one another is less than a joining force between the joining elements (20; 21-25) and the container wall (2, 3) and/or between the joining element (20; 21-25) and the reinforcing element (10; 11, 12).

13 Claims, 2 Drawing Sheets

(58) Field of Classification Search
USPC .............................. 220/562, 560.11; 156/156
See application file for complete search history.

(56) References Cited

U.S. PATENT DOCUMENTS

2014/0014663 A1   1/2014   Eulitz et al.
2014/0305936 A1   10/2014  Gebert et al.

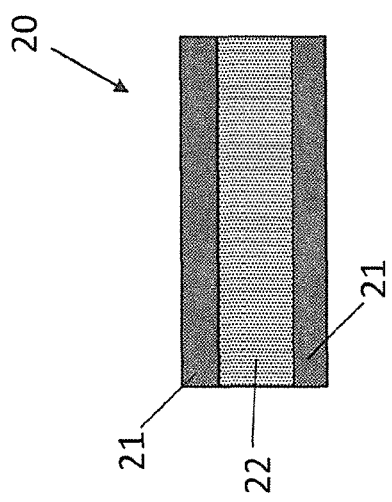
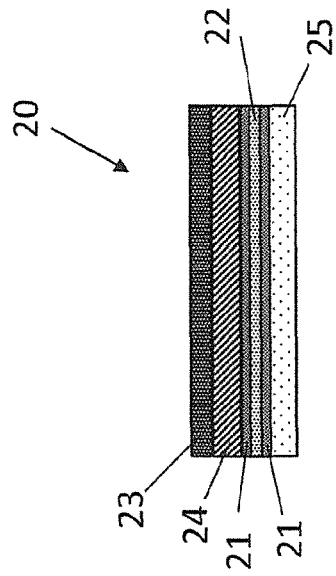
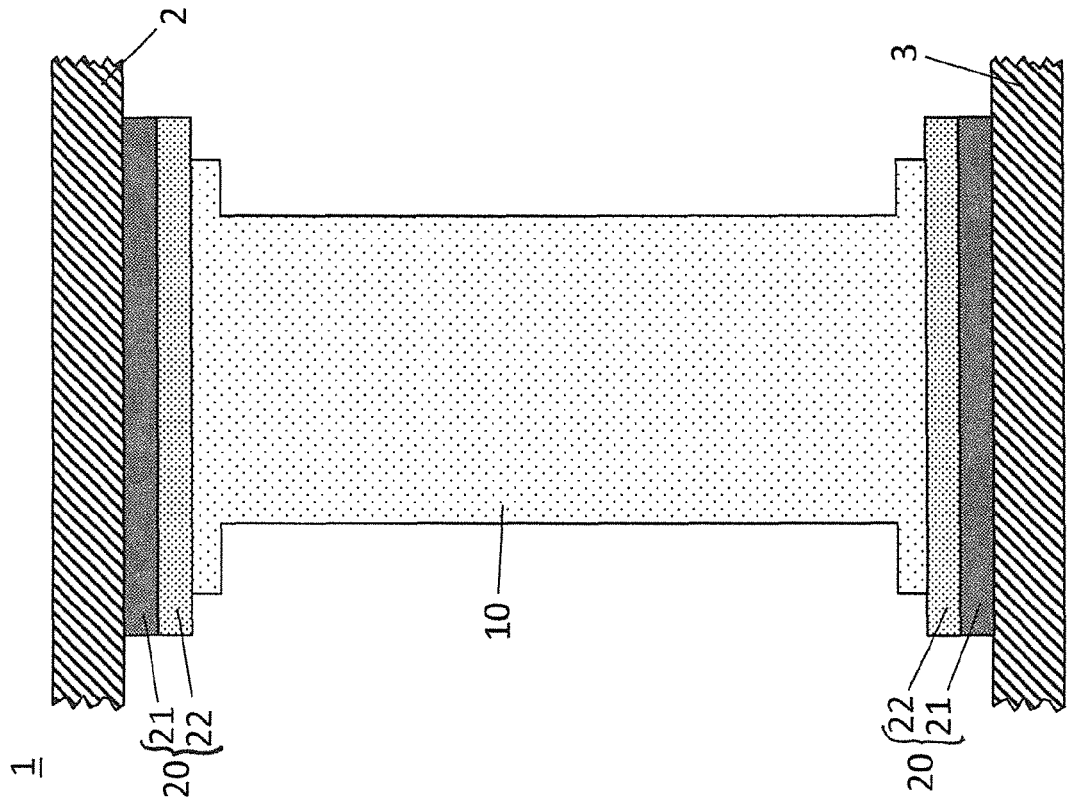

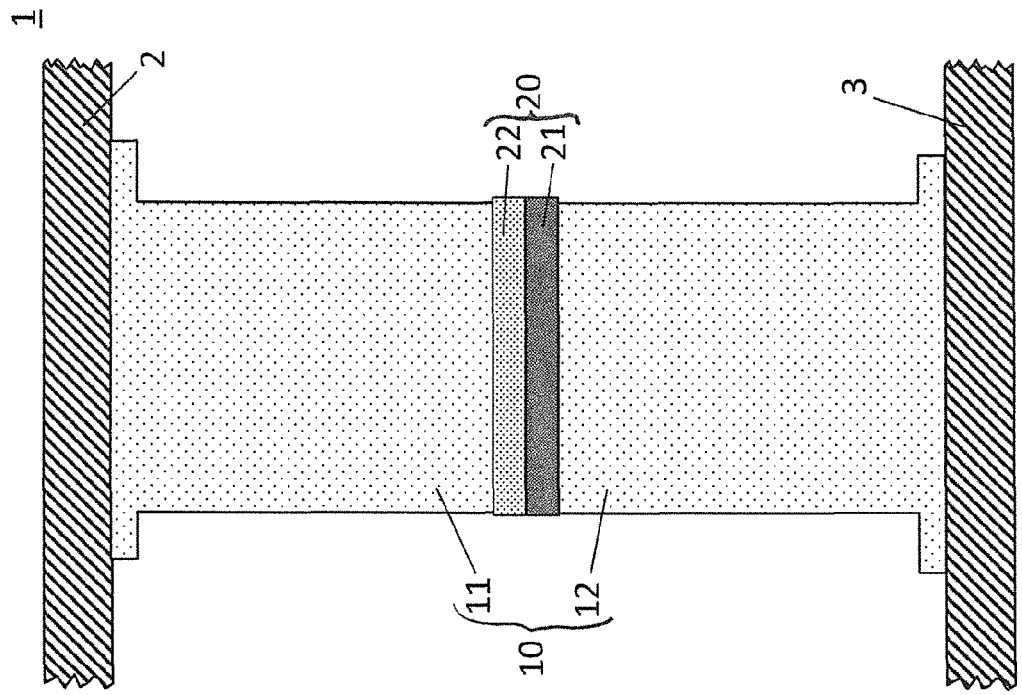
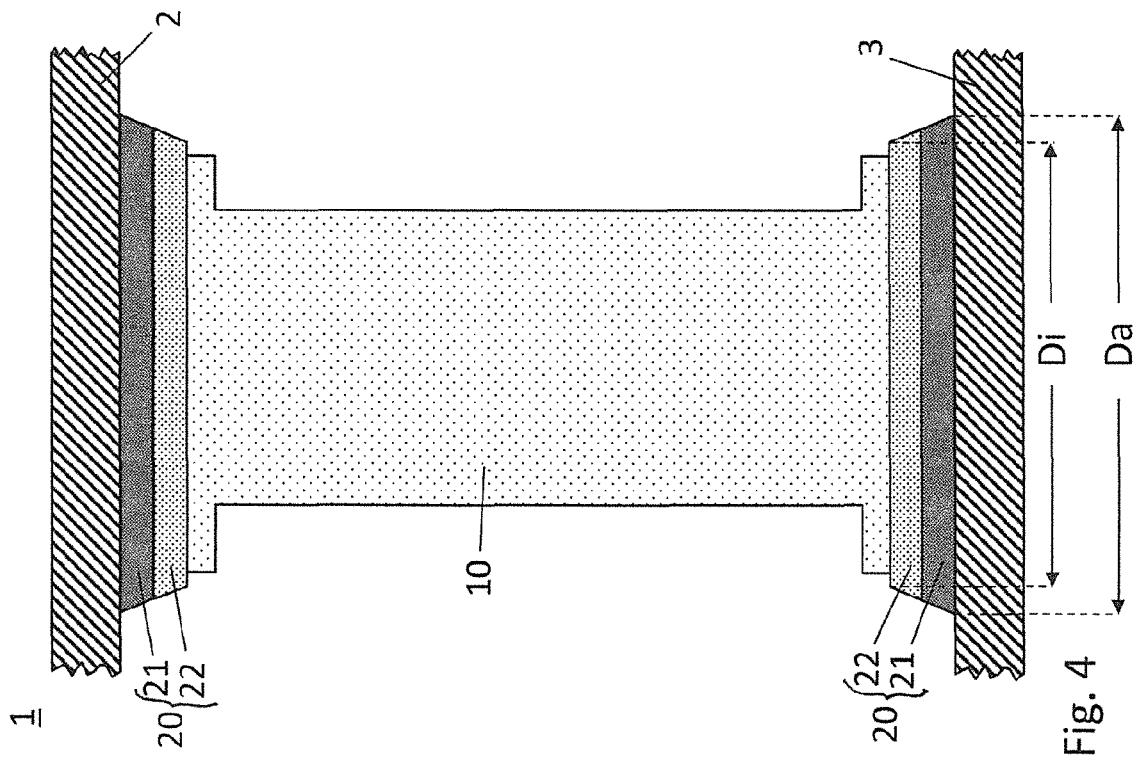

OPERATING FLUID CONTAINER HAVING A PREDETERMINED BREAKING POINT

The invention relates to an operating fluid container composed of a thermoplastic for a motor vehicle.

Operating fluid containers in the sense according to the invention can be fuel tanks, containers for storing aqueous urea for selective catalytic reduction of nitrogen oxides in exhaust gases, wiper fluid containers or, more generally, other containers for storing operating fluids, for example.

In the case of operating fluid containers known from the prior art, a reinforcing element is arranged in the interior of the operating fluid container in order to reinforce it, wherein the reinforcing element is generally joined to an upper shell and a lower shell of the operating fluid container. The reinforcing element and the respective container shells are joined materially by adhesive bonding or welding, for example. However, positive joining by riveting, screwing or by means of a bayonet joint is also possible.

Operating fluid containers in the form of plastic containers generally have a multi-layer structure. Normally, the outer shell is composed of carbon-blacked HDPE (high-density polyethylene), which is joined to a recyclate layer. In the recyclate layer, excess material that arises during the production of the operating fluid container is reused. The recyclate layer is joined to an ethylene vinyl alcohol copolymer layer (EVOH layer) serving as a barrier layer by means of a layer of modified LDPE (low-density polyethylene) serving as an adhesive layer. The EVOH layer is joined by means of a further layer of modified LDPE to a "virgin" HDPE layer, which faces the interior of the operating fluid container.

In the case of such operating fluid containers of multilayer construction, the joining force between the respective layers may be less than the joining force between the reinforcing element and the container wall. In particular, the joining force between the LDPE layers serving as adhesive layers and the EVOH layer can be relatively low, with the result that the inner wall of the operating fluid container may be detached from or torn out of the overall operating fluid container wall in the region of the reinforcing element in the event of impact loading of the operating fluid container. Given a sufficiently high load, it is also possible that the operating fluid container wall may be torn through completely.

One known way of solving this problem in the prior art is to provide predetermined breaking points in the reinforcing element, at which the reinforcing element suffers structural failure in the event of impact loading of the operating fluid container, ensuring that the outer wall of the operating fluid container remains undamaged. Known predetermined breaking points in the reinforcing element are recesses in the material, tapering of the material, reductions in cross section or perforations in the material of the reinforcing element, for example.

Reinforcing elements are often composed of or comprise HDPE, which exhibits nonuniform behaviour owing to the viscoelastic property of the material thereof. In the event of low temperatures of, for example, −40° C. and impact loading, a reduction in cross section in the reinforcing element can achieve the desired predetermined breaking effect, for example. However, this predetermined breaking effect is not achieved at higher temperatures of +60° C., for example, and a slow rise in the loading (especially due to internal pressurization). In this case, the HDPE is deformed only plastically, with the result that, in the case where the reinforcing element is welded to the operating fluid container wall, for example, there is delamination between the adhesive layer and the EVOH layer at the welded joint with the inner wall of the operating fluid container owing to the intimate joining of the materials (material bond). This effect is promoted by cyclic loading, which leads to alternating excess pressure and vacuum in the operating fluid container, particularly due to alternate heating and cooling of the operating fluid container.

It is the underlying object of the present invention to provide an improved operating fluid container reinforced by a reinforcing element, the operating fluid container wall of which suffers less damage in the event of impact loading of the operating fluid container, the operating fluid container wall of which is subject to reduced delamination and which furthermore has low production costs.

This object is achieved by an operating fluid container having the features indicated in Claim 1. Advantageous embodiments are described in the claims dependent thereon.

An operating fluid container according to the invention composed of thermoplastic for a vehicle comprises a reinforcing element, which is arranged between two container walls of the operating fluid container and is at least indirectly joined to the container walls. The operating fluid container according to the invention is characterized by the fact that the container walls are joined to one another via the reinforcing element by means of at least one joining element. The joining element, in turn, comprises at least two material layers joined to one another, wherein a joining force joining these two material layers to one another is less than a joining force between the joining element and the container wall and/or between the joining element and the reinforcing element.

The operating fluid container according to the invention offers the advantage that, when the operating fluid container is subject to impact loading, the predetermined breaking point is formed at the interface between the two material layers of the joining element, and therefore the joining element comes apart at the interface between the material layers thereof when a predetermined load is exceeded. Consequently, the external skin of the operating fluid container is not damaged, and therefore operating fluid, e.g. fuel, cannot escape from the operating fluid container. Moreover, the above-described delamination effect on the operating fluid container walls is also reduced. Another advantage of the operating fluid container according to the invention lies in the low production costs since there is no need for expensive joining techniques for joining the reinforcing element to the service container walls. Thus, for example, a joining element can be joined to an inner side of a service container wall by a weld, for example. The same applies to the joint between the reinforcing element and the joining element. Both can be joined materially to one another by respective welds.

As an alternative, the joint between the joining element and a container wall can be made by means of an adhesive joint. The same applies to the joint between the joining element and the reinforcing element. These can also be adhesively bonded to one another.

However, the joint between the joining element and the container wall and that between the joining element and the reinforcing element are not limited to material joints. The joints mentioned can also be achieved positively, e.g. by means of riveted joints or by means of overmoulded components consisting of two-component plastic parts.

In the operating fluid containers according to the invention, the reinforcing element counteracts a deformation of the operating fluid container caused by excess pressure and/or by a vacuum.

The reinforcing element can be joined to the container walls directly and/or indirectly via a joining element. Here, joining to the container walls in the sense according to the invention refers, of course, to joining to the respective inner surfaces of the container walls.

An interface between the at least two material layers of the joining element preferably extends parallel to a contact area of the joining element with the container wall and/or to a contact area of the reinforcing element with the container wall. Moreover, the interface between the two material layers of the joining element preferably extends parallel to interfaces of material layers in the container wall in the region of the joining of the container wall to the joining element or the reinforcing element.

In the event of shear loading of the operating fluid container according to the invention, at least one force component acts parallel to the interface between the two material layers of the joining element owing to the shear loading.

The reinforcing element is preferably directly joined to the at least one joining element. This reduces the number of component elements and the number of method steps required to join the reinforcing element to the container walls of the operating fluid container.

The joining element is preferably arranged between a container wall and the reinforcing element and is joined directly both to the container wall and to the reinforcing element. This allows particularly simple fastening of the joining element to the container wall and of the reinforcing element to the joining element.

In another preferred embodiment, the operating fluid container according to the invention comprises at least two joining elements, wherein a first joining element is joined directly to a first container wall and a second joining element is joined directly to a second container wall. In this arrangement, the reinforcing element is arranged between the first joining element and the second joining element and is joined directly to each of said elements. A correspondingly designed operating fluid container offers the advantage that it has two predetermined breaking points. The first container wall can be an upper shell, for example, and the second container wall can be a lower shell of the operating fluid container, for example. However, the first container wall and the second container wall can also be side walls of the operating fluid container.

In another preferred embodiment of the operating fluid container according to the invention, the reinforcing element comprises a first reinforcing element part and a second reinforcing element part. The first reinforcing element part is joined to a first container wall and the second reinforcing element part is joined to a second container wall. The joining element, in turn, is arranged between the first reinforcing element part and the second reinforcing element part and is joined directly to each of said parts.

A correspondingly designed operating fluid container offers the advantage that the predetermined breaking point can be arranged centrally between the two container walls of the operating fluid container, with the result that the forces acting on the operating fluid container can be absorbed centrally by the predetermined breaking point between the two material layers of the joining element, and only a single joining element has to be provided.

Of course, it is also possible for the reinforcing element parts to be joined to the respective container walls by a further joining element in each case, thus creating further predetermined breaking points at these joints.

In another preferred embodiment of the operating fluid container, the joining element is of conical design and is joined to the container wall in such a way that a contact area between the first material layer and the second material layer is smaller than a contact area between the joining element and the container wall. A corresponding embodiment offers the advantage that the two material layers of the joining element are joined to one another by way of a smaller contact area than is the reinforcing element to the container wall, with the result that the predetermined breaking point is formed with an even greater reliability by the boundary layer between the two material layers of the joining element.

A first contact area of a first material layer is preferably larger than a second contact area of a second material layer, wherein the joining element is joined to a container wall by means of the first material layer and is joined to the reinforcing element by means of the second material layer. A correspondingly designed operating fluid container likewise offers the advantage that the predetermined breaking point is formed with an even greater reliability by the interface between the two material layers, wherein the shaping of the joining element can be made more variable through an appropriate configuration.

The respective mutually adjacent material layers of the joining element are preferably each joined materially to one another. In this case, the material joint between the material layers can expediently be implemented by means of a weld. Of course, an adhesive joint is also possible.

In another preferred embodiment, the joining element comprises three material layers.

In this case, the joining element preferably comprises an EVOH layer, which is arranged sandwich-fashion between two LDPE layers and is joined to each of said layers.

Appropriate design of the joining element allows the latter to be joined reliably to a container wall and to the reinforcing element by a weld, wherein the predetermined breaking points are reliably implemented by means of the two interfaces between the EVOH layer and the two adhesive layers designed as LDPE layers. It is furthermore possible, by varying the density of the LDPE layers, for example, to adapt the thickness of the joint between the LDPE layers and the EVOH layer to the prevailing circumstances.

In another preferred embodiment of the operating fluid container according to the invention, the joining element/the joining elements is/are formed from the same material layers as the container walls of the operating fluid container. This offers the advantage that the joining element can be punched out of the parison waste material. In this case, the joining element has a 5-layer or a 6-layer structure. In the case of a 6-layer structure of the joining element, said joining element comprises a carbon-blacked HDPE layer, a recyclate layer, an LDPE layer, an EVOH layer, another LDPE layer and a virgin HDPE layer in this order.

A correspondingly designed operating fluid container offers the advantage that there is no need to develop a separate material sandwich for the joining elements; instead, the already existing material sandwich from which the container walls are formed can be used for the joining elements.

The reinforcing element preferably acts as a tension strut when there is excess pressure in the operating fluid container and/or as a compression strut when there is a vacuum in the operating fluid container.

In another preferred embodiment of the operating fluid container, the reinforcing element is designed as a two-component part. In the region of joining to the joining element and/or to the container walls, the reinforcing element can be composed of polyethylene (e.g. HDPE), for example, wherein the remaining part of the reinforcing element can be composed of polyamide and/or POM (polyoxymethylene) and/or PBT (polybutylene terephthalate) and/or PK (polyketone), for example. These parts of the reinforcing element are more rigid and more brittle than polyethylene and cannot swell due to the fuel in the case of an operating fluid container designed as a fuel tank for example, and they are therefore dimensionally stable.

Further advantages, details and features of the invention will emerge below from the illustrative embodiments explained. In particular:

FIG. 1: shows a cross section through an operating fluid container according to the invention in accordance with a first embodiment of the present invention;

FIG. 2: shows a cross section through a joining element consisting of three material layers;

FIG. 3: shows a cross section through a joining element consisting of six material layers;

FIG. 4: shows a cross section through the operating fluid container according to the invention in accordance with a second embodiment of the present invention; and FIG. 5: shows a cross section through the operating fluid container according to the invention in accordance with a third embodiment of the present invention.

In the description which now follows, identical reference signs denote identical components or identical features, and therefore the description given in respect of one component with reference to one figure also applies to the other figures, thus avoiding repeated description.

FIG. 1 shows a cross section through an operating fluid container 1 reinforced by means of a reinforcing element 10. The reinforcing element 10 is arranged between two container walls 2, 3 of the operating fluid container. Here, container wall 2 is designed as an upper shell 2 and container wall 3 is designed as a lower shell 3 of the operating fluid container 1.

Respective joining elements 20 are arranged between each of the end regions of the reinforcing element 10 and the upper shell 2 and lower shell 3. In the illustrative embodiment shown, the joining elements 20 each comprise at least two material layers 21, 22 joined to one another. The first material layer 21 can be an HDPE layer, an LDPE layer, an EVOH layer, a layer consisting of a thermoplastic or of some other plastic, for example. The second material layer 22 can likewise be an HDPE layer, an LDPE layer of various densities, an EVOH layer, a layer of thermoplastic or a layer of some other plastic. Consequently, the upper container wall 2 is joined to the lower container wall 3 by means of two joining elements 20 and by means of the reinforcing element 10. However, it is also possible to use just one joining element 20, which is arranged between the reinforcing element 10 and a container wall 2, 3.

The selection of material for the two material layers 21, 22 is such that a joining force joining the two material layers 21, 22 to one another is less than a joining force between the joining element 20 and the reinforcing element 10 and/or less than a joining force between the joining element 20 and the container wall 2, 3 and/or less than a joining force between material layers of the container walls 2 and 3, although the layered structure of the container walls is not apparent from the drawings.

In the illustrative embodiment shown, the joining force between the first material layer 21 and the second material layer 22 is less than the joining force between the second material layer 22 and the reinforcing element 10 and/or less than a joining force between the first material layer 21 and a container wall 2, 3.

The first material layer 21 can be joined to a container wall 2, 3 by a weld or by an adhesive joint, in particular. The joining of the second material layer to the reinforcing element 10 can likewise be achieved by a weld or an adhesive joint, in particular, i.e. can be achieved by a material joint. However, it is also possible for the reinforcing element 10 to be joined to the two material layers 22 of the reinforcing element 20 by a positive joint, e.g. by means of a riveted joint. The same applies to the joining of the first material layers 21 to the container walls 2, 3. To this extent, there are no limitations.

If the operating fluid container 1 illustrated in FIG. 1 is subjected to impact loading, the interfaces between the first material layers 21 and the second material layers 22 of the joining elements 20 serve as predetermined breaking points since they represent the weakest link in the joint between the upper shell 2 and the lower shell 3. In the case of a shear load on the operating fluid container 1 according to the invention which exceeds a limiting load too, the joining element 20 illustrated at the top in FIG. 1 or the joining element 20 illustrated at the bottom in FIG. 1 will break up between the respective material layers 21, 22, ensuring that neither the upper shell 2 nor the lower shell 3 of the operating fluid container 1 is damaged. The same applies if a tensile load by the reinforcing element 10 exceeds a limiting load.

The reinforcing element 10 can be designed as a 2-component part, wherein a central segment of the reinforcing element 10 can be composed of polyamide and/or POM and/or PBT and/or PK plastic, whereas the contact regions of the reinforcing element 10, which are in contact with the joining elements 20, are composed of a thermoplastic. Thus, the reinforcing element can be welded in a simple manner to the joining elements 20.

FIG. 2 shows a cross section through a joining element 20 consisting of three material layers 21, 22. In this case, the relations between the material thicknesses of the respective material layers are not shown to scale. The same applies to the joining elements 20 illustrated in the other figures, FIGS. 1, 3 to 5.

The second material layer 22 is arranged sandwich-fashion between two first material layers 21 and is joined materially thereto. The second material layer 22 can be designed as an EVOH layer 22, for example, whereas the first material layers 21 can be designed as LDPE layers 21.

This offers the advantage that the joining element can be joined both to a container wall 2, 3 and to the reinforcing element 10 simply by means of a weld. The joint between the EVOH layer 22 and the LDPE layers 21 is weaker than the joint between the LDPE layers 21 of the joining element 20 and the container wall 2, 3 and the reinforcing element 10, with the result that the predetermined breaking point or predetermined breaking areas is/are formed at one of the two interfaces between the EVOH layer 22 and the LDPE layers 21, given appropriate impact loading of the operating fluid container 1.

Another joining element 20, which comprises six material layers 21-25, is illustrated in cross section in FIG. 3. In this case, these six material layers 21-25 are the same material layers from which the container walls 2, 3 of the operating fluid container 1 are formed. The joining element 20 illustrated in FIG. 3 is bounded by a carbon-blacked HDPE layer 23 and by a virgin HDPE layer 25. The carbon-blacked HDPE layer is joined to a recycle layer 24, which is joined to an EVOH layer 22 by means of an LDPE layer 21 serving as an adhesive layer. The EVOH layer 22 is joined to the virgin HDPE layer 25 by way of another LDPE layer 21 serving as an adhesive layer.

In FIGS. 1, 4 and 5, the joining elements 20 are each of two-layer design but it is also possible for joining elements 20 in accordance with the embodiment in FIG. 2 or in accordance with the embodiment in FIG. 3 to be used in the operating fluid containers 1 illustrated in FIGS. 1, 4 and 5.

FIG. 4 shows a second embodiment of the operating fluid container 1 according to the invention in cross section. The operating fluid container illustrated in FIG. 4 is similar to the operating fluid container 1 illustrated in FIG. 1, with only the cross-sectional shape of the joining element 20 differing from the cross-sectional shape of the joining element 20 illustrated in FIG. 1.

The two joining elements 20 are each of conical design and are each joined by means of the first material layer 21 thereof to the upper shell 2 and to the lower shell 3 in each case. In the cross section according to FIG. 4, the joining elements 20 taper in the direction of the second material layer 22, with the result that a contact area between the first material layer 21 and the second material layer 22 is smaller than a contact area of the joining element 20, in the case of the first material layer 21, with the container wall 2, 3.

Consequently, a first contact area of the first material surface 21 is larger than a second contact area of the second material layer 22, wherein the joining element 20 is joined by means of the first material layer 21 to one of the container walls 2, 3 and is joined to the reinforcing element 10 by means of the second material layer 22.

Since the joining area between the first material layer 21 and the second material layer 22 is smaller than a joining area of the first material layer 21 relative to one of the container walls 2, 3, an appropriate embodiment of the operating fluid container is used to ensure that the predetermined breaking point is formed with increased reliability by the interface between the first material layer 21 and the second material layer 22 of the joining element 20.

Of course, it is also possible for the joining elements 20 illustrated in FIGS. 2 and 3 to have an embodiment corresponding to FIG. 4.

A third embodiment of the operating fluid container 1 according to the invention is illustrated in a schematic cross section in FIG. 5. Here, the reinforcing element 10 comprises a first reinforcing element part 11 and a second reinforcing element part 12. In this case, the first reinforcing element part 11 is joined to the upper shell 2 and the second reinforcing element part 12 is joined to the lower shell 3. The joining element 20 is accommodated sandwich-fashion between the first reinforcing element part 11 and the second reinforcing element part 12 and is joined to each of these.

Of course, it is also possible for the joining element 20 illustrated in FIG. 5 to be of 3-layer or 6-layer design in accordance with the embodiments illustrated in FIGS. 2 and 3. It is also possible for the joining element 20 illustrated in FIG. 5 to have a conical shape in cross section, as illustrated schematically in FIG. 4.

The first reinforcing element part 11 and the second reinforcing element part 12 are joined to the corresponding container walls 2, 3, wherein this joining can be accomplished materially and/or positively. Consequently, a weld, an adhesive joint and/or a riveted joint can be provided for joining. The functioning of the operating fluid container 1 illustrated in FIG. 5 is identical in other respects with the functioning of the operating fluid container 1 illustrated in FIG. 1.

LIST OF REFERENCE SIGNS 1 operating fluid container/fuel tank
2 upper shell, container wall (of the operating fluid container)
3 lower shell, container wall (of the operating fluid container)
10 reinforcing element
11 upper reinforcing element part
12 lower reinforcing element part
20 joining element
21 first material layer/LDPE layer/adhesive layer (of the joining element)
22 second material layer/EVOH layer (of the joining element)
23 carbon-blacked HDPE layer
24 recyclate layer
25 virgin HDPE layer
Da diameter of the contact area of the joining element in contact with a container wall
Di diameter of the contact area of the joining element in contact with the reinforcing element

What is claimed is:

1. An operating fluid container composed of thermoplastic for a motor vehicle, wherein the operating fluid container comprises:
   the operating fluid container comprises a reinforcing element;
   the reinforcing element is arranged between two container walls of the operating fluid container and is at least indirectly joined to the container walls;
   the container walls are joined to one another indirectly via the reinforcing element by at least one joining element;
   the joining element comprises at least two material layers joined to one another; and
   a joining force joining the two material layers to one another is less than a joining force between the joining element and the container wall and/or between the joining element and the reinforcing element.

2. The operating fluid container according to claim 1, wherein the reinforcing element is directly joined to the at least one joining element.

3. The operating fluid container according to claim 1, wherein the joining element is arranged between a container wall and the reinforcing element and is joined directly both to the container wall and to the reinforcing element.

4. The operating fluid container according to claim 1, comprising:
   the operating fluid container comprises at least two joining elements;
   a first joining element is joined directly to a first container wall and a second joining element is joined directly to a second container wall;
   the reinforcing element is arranged between the first joining element and the second joining element and is joined directly to each of said elements.

5. The operating fluid container according to claim 1, further comprising:
   the reinforcing element comprises a first reinforcing element part and a second reinforcing element part;
   the first reinforcing element part is joined to a first container wall and the second reinforcing element part is joined to a second container wall; and the joining element is arranged between the first reinforcing element part and the second reinforcing element part and is joined directly to each of said parts.

6. The operating fluid container according to claim 1, wherein the joining element is of conical design and is joined to the container wall in such a way that a contact area between the first material layer and the second material layer is smaller than a contact area between the joining element and the container wall.

7. The operating fluid container according to claim 1, further comprising:
a first contact area of a first material layer is larger than a second contact area of a second material layer; and
the joining element is joined to a container wall by the first material layer and is joined to the reinforcing element by the second material layer.

8. The operating fluid container according to claim 1, wherein adjacent material layers of the joining element are each joined materially to one another.

9. The operating fluid container according to claim 1, wherein the joining element comprises three material layers.

10. The operating fluid container according to claim 9, wherein the joining element comprises an EVOH layer, which is arranged sandwich-fashion between two LDPE layers and is joined to each of said layers.

11. The operating fluid container according to claim 4, wherein the joining element or the joining elements is/are formed from the same material layers as the container walls.

12. The operating fluid container according to claim 1, wherein the reinforcing element acts as a tension strut when there is excess pressure in the operating fluid container and/or as a compression strut when there is a vacuum in the operating fluid container.

13. The operating fluid container according to claim 1, wherein the reinforcing element is designed as a two-component part.

\* \* \* \* \*